Patented Nov. 1, 1927.

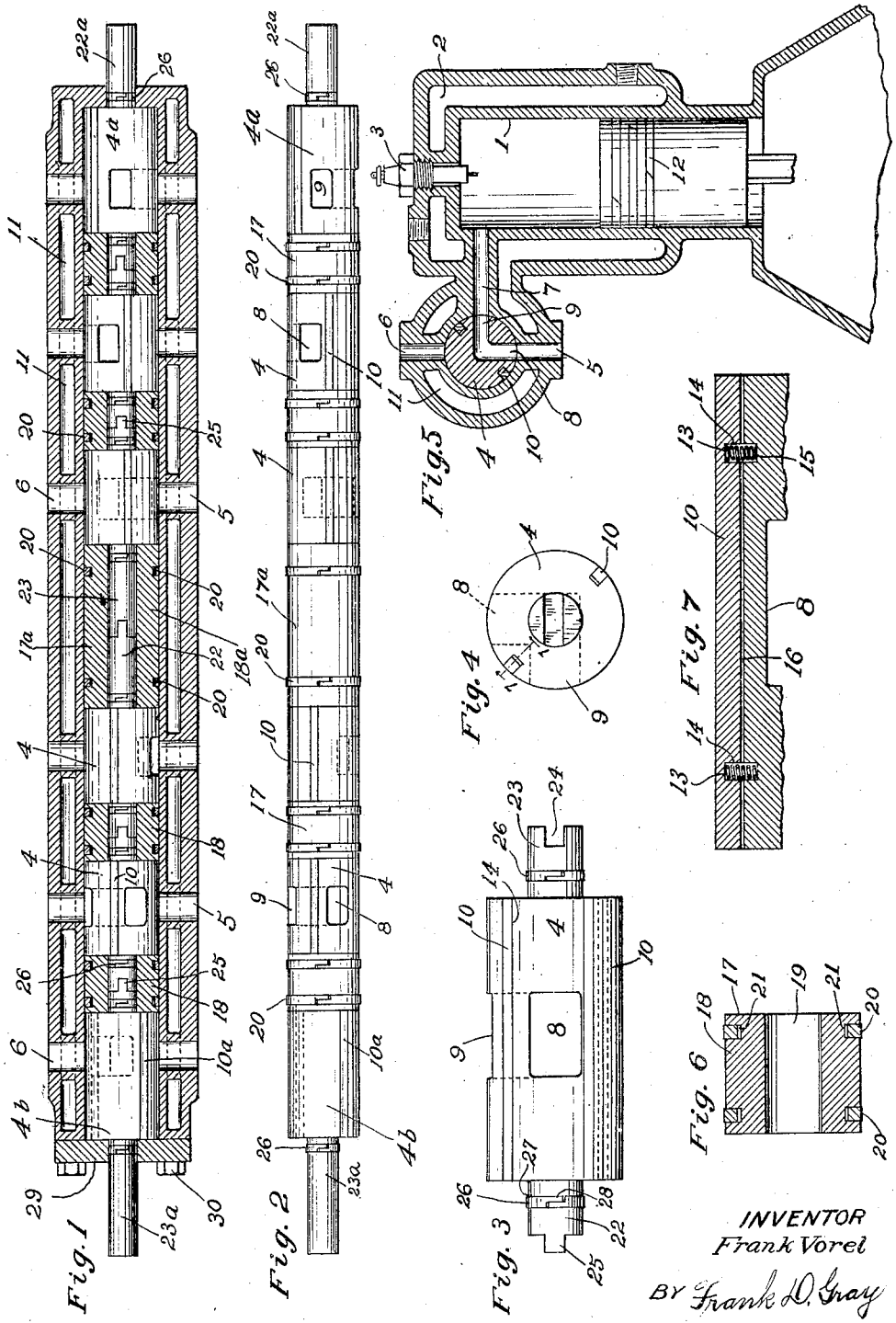

1,647,592

UNITED STATES PATENT OFFICE.

FRANK VOREL, OF CLEVELAND, OHIO, ASSIGNOR OF ONE-HALF TO JOSEPH E. MORAVEC, OF CLEVELAND, OHIO.

ENGINE VALVE.

Application filed October 18, 1924. Serial No. 744,497.

This invention relates to engine valves, and especially to valves for internal combustion engines, and has for an object to provide an improved rotary valve to be employed in cylinder gas engines.

It is a special object of this invention to provide a rotary valve made up of detachable sections designed to be mounted in alinement, there being a separate section for controlling each cylinder, the several sections being keyed together axially, so that distortion of one section need not affect the others.

A further object of this invention is to provide a composite rotary valve made up of sections mounted in a cylindrical opening in a casing, each of said sections having longitudinal peripheral grooves and transverse L-shaped tubes therein for directing gases therethrough, the sections being otherwise solid, and provided with longitudinal bars seated in said grooves and spring-pressed outwardly.

It is a further object of my invention to provide a composite rotary valve within a casing and made up of cylindrical sections with integral, axial, reduced elements, and to further provide annular members between the valve sections for receiving the reduced members for rotation therein.

It is a still further object to provide both the axial, reduced members, and the annular members, with ring members mounted in peripheral grooves and expanded in each, and normally outwardly expanded to a larger radius than that of the groove.

These and other objects I attain by means of a construction embodying the features recited in the claims, and hereinafter described, and illustrated in the accompanying drawings, in which Figure 1 is a central longitudinal section of the valve and casing, with certain rotary parts in elevation;

Figure 2 is a side elevation of the composite valve and bearing members;

Figure 3 is a side elevation of a cylindrical valve section;

Figure 4 is an end elevation of a valve section;

Figure 5 is a central vertical section through an engine cylinder;

Figure 6 is a central longitudinal section through one of the bearing members, and Figure 7 is an enlarged sectional view taken on the line 7—7 of Fig. 4.

In the improved valve construction illustrated, the composite, rotary valve made up of sections 4, 4<sup>A</sup> and 4<sup>B</sup> is mounted in a water-cooled casing 11, at right angles to a series of alined cylinders 1 carrying pistons 12, and each cylinder being provided with a casing 2 and a plug 3. The construction shown embodies a rotary valve designed to be used in an internal combustion engine of the four-cycle type and having six cylinders, though it is to be understood that any number of cylinders may be used and that this valve may readily be adapted to the two-cycle type.

These valve sections are solid, save that each is provided with an L-shaped cross channel opening peripherally at 8 and 9, respectively. Each section has a reduced bearing extension at either end concentric with the section, one extension 22 having a cross piece 25, and the other 23 having a notch 24 adapted to fit the cross piece of the adjacent section. The valve section at one end of the shaft has been lengthened and designated by numeral 4<sup>B</sup>, and the section at the opposite end of the shaft likewise lengthened and designated 4<sup>A</sup>. The four inner valve sections 4 are of equal length.

The said valve sections are mounted for rotation within the casing by means of annular bearing members 17 having an axial opening adapted to fit the extensions 22 and 23 of the sections, as shown in Fig. 1, where the parts 24 and 25 of the extensions appear in locked relation within the opening 19 of the member 17. These bearing members 17 comprise rather heavy sleeves 18 having spaced, parallel peripheral grooves 21 in which are seated expansion rings 20 having over-lapping ends, and normally expanded somewhat above the surface of the sleeve, as shown clearly in Fig. 6. Their ends overlap in the same manner that the ends 28 of the expansion rings 26 are shown in Figs. 2 and 3, these latter rings being similarly positioned in cross grooves 27 of the extensions 22 and 23. It is thus seen that the sleeves 18 fit rather loosely in the opening of the casing, but are held tightly therein by the outward expansion of the rings 20. The latter also serve the further purpose of preventing leakage of gases from one valve section to another. Likewise, the rings 26 fit tightly in the opening 19, but permit the easy rotation of the extensions 22 and 23 in the rings. I have found these conditions advantageous because of the relative expansion and contraction of the parts due to the varying temperatures arising from the operation of the engine.

The valve sections 4, together with the end sections 4$^A$ and 4$^B$, are further provided with means for causing a tight fit within the casing opening, comprising oppositely arranged peripheral grooves 16 extending longitudinal of the sections and having seated therein elongated bars 10 of the same length of the sections and slightly less thickness than the depth of the grooves. These bars are normally pressed outward against the wall of the casing opening by means of coil springs 13 seated in corresponding sockets 14 of the bars and 15 at the bottom of the groove 16. This pair of bars will therefore permit a tight fitting for the valve, and at the same time make possible the use of sections 4 of sufficiently small radius to allow possible expansion thereof by the excessive heat encountered, without too tightly engaging the casing. As the section expands, the bars sink to a greater depth and compensate for such effect.

While in a six cylinder engine, there will be four sleeves 18, the two sets of sections 4 will be more widely separated by a longer sleeve 18$^a$, thereby requiring longer extensions 22 and 23 within this sleeve. These elongated extensions will however, be connected by parts 24 and 25 just as are the other extensions. At the ends of the composite valve, the elongated extensions 22$^a$ and 23$^a$ project out through openings in the ends of the casing, as shown in Figs. 1 and 2. Rings 26 are mounted in such end openings, and are mounted in grooves in said extensions, just as such rings are provided within the casing.

In operation, it is to be understood that the various sections of my composite valve will operate together within the several bearing members 17 and 17$^a$, and power may be transmitted to the valve from either end of the casing, and by any desired means of transmission. The present invention is not especially concerned with the means for rotating said shaft, and it is not therefore illustrated, being considered more or less conventional. It may be said however, that it is suggested that the speed of the valve shaft shall be one-half that of the crank shaft, and that this may be easily attained by the provision of suitable gears connecting the two shafts. As shown in Fig. 5, the valve sections 4 are provided with the openings 8 and 9, which in the position illustrated, register with the openings 5 and 7 in the casing, the latter leading to the upper end of a cylinder. It will be readily understood that when the opening 8 registers with opening 7, the opening 9 of the valve will register with opening 6 in the casing. The operation of such connections by means of said openings are well understood, and need not be further described in this case.

In assembling the parts of the valve, assuming that the end plate 29 has not yet been applied to the casing, the end section 4$^a$ with its integral extensions 22$^a$ and 23 is first inserted in the open end of the casing, with the ring 26 applied in the groove 27 of the extension 22$^a$. When the larger part of the said extension has been inserted flush with the end of the casing, another ring 26 is applied in the groove of extension 23, a sleeve 18 with rings 20 seated in its grooves 21 is mounted upon extension 23, the next section 4 with a ring 26 thereon is applied to the end of sleeve 18, so that extensions 22 and 23 will fit with the parts 24 and 25 in locking engagement, and the last section 4 is pushed forward into the casing until only extension 23 protrudes therefrom, when the process is repeated, another sleeve applied, and another section 4 inserted, rings 20 and 26 being in every case applied in regular order. This process continues until the last section 4$^b$ is inserted, after which the plate 29 is applied and fastened in position by the nuts 30.

It will be thus seen that I have provided a rotary sectional valve that will afford easy rotation of all sections within the several bearing cylinders, with varying degrees of expansion, and yet providing leak-proof conditions without unduly increasing the friction of movement.

While some of the details of my structure are not regarded as entirely essential, as for example, the form of spring for normally urging the bar 10 outwardly need not be the particular coiled spring 13 illustrated, this form is regarded as practicable, and the general arrangement of parts is that I propose to use in actual operation.

Having thus described my invention what I claim as new and desire to secure by Letters Patent is:

1. In a mutli-cylinder gas engine of the single rotary valve type, a common valve casing above the cylinders, in combination with a composite sectional valve in the bore of said casing, composed of an independent section for each cylinder, and divided transversely from each other, each section having a reduced axial extension at either end, the extensions of adjacent sections having detachable driving connection for articulation between sections, and a bearing member for enclosing each pair of extensions at their junction.

2. In a multi-cylinder gas engine of the rotary valve type, a composite sectional valve comprising, an independent section for each engine cylinder, the several sections being in alinement and each having a reduced axial extension at either end thereof, said extensions having means to cause all the sections to rotate together, and means for enclosing each pair of extensions at their junction.

3. In a multi-cylinder gas engine of the single rotary valve type, a composite sectional valve comprising, a plurality of independent sections arranged in alinement, each section having at each end thereof a reduced axial extension, means on the several extensions to cause all the sections to rotate together, sleeves having the same diameter as the sections and enclosing the several pairs of extensions, annular packing rings seated in grooves in said extensions for guiding the latter in their rotation in the sleeves, and annular packing rings seated in grooves in said sleeves for preventing leakage of gases from one valve section to another.

4. In a multi-cylinder gas engine of the single rotary valve type, a common valve casing communicating with the cylinders, in combination with a composite sectional valve in the bore of said casing comprising, an independent section for each cylinder divided transversely from each other, each section having a reduced axial extension at each end, means on the several extensions to cause all the sections to rotate together, sleeves having the same diameter as the sections and enclosing the several pairs of extensions, and annular packing rings seated in grooves in said extensions for guiding the latter in their rotation in the sleeves.

5. In a multi-cylinder gas engine of the single rotary valve type, a common valve casing communicating with the cylinders, in combination with a composite sectional valve in the bore of said casing comprising, an independent section for each cylinder divided transversely from each other, each section having a reduced axial extension at each end, means on the several extensions to cause all the sections to rotate together, sleeves having the same diameter as the sections and enclosing the several pairs of extensions, annular packing rings seated in grooves in said extensions for guiding the latter in their rotation in the sleeves, annular packing rings seated in grooves in said sleeves for preventing leakage of gases from one valve section to another, and elongated bars seated in longitudinal peripheral grooves of said sections to permit fitting of the latter tightly within the casing notwithstanding variation in the expansion of the parts due to differences in temperature.

6. A valve shaft comprising longitudinal valve sections, each section having transverse channels therethrough, and reduced axial extensions at either end thereof, stationary bearing sleeves enclosing said extensions, there being peripheral grooves about said sleeves and other grooves about said extensions, and yielding rings sprung into said grooves in the sleeves as well as in the extensions, whereby the sleeves will remain stationary in the casing but avoiding leaking longitudinal thereof, and the sectional shaft may rotate within the sleeves.

In testimony whereof I hereunto affix my signature.

FRANK VOREL.